US009972006B2

(12) United States Patent
Lu et al.

(10) Patent No.: US 9,972,006 B2
(45) Date of Patent: May 15, 2018

(54) METHOD FOR SECURE EXECUTION OF ENTRUSTED MANAGEMENT COMMAND

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 213 days.

(21) Appl. No.: 15/035,246

(22) PCT Filed: Nov. 28, 2014

(86) PCT No.: PCT/CN2014/092470
§ 371 (c)(1),
(2) Date: May 9, 2016

(87) PCT Pub. No.: WO2015/096593
PCT Pub. Date: Jul. 2, 2015

(65) Prior Publication Data
US 2016/0292670 A1     Oct. 6, 2016

(30) Foreign Application Priority Data

Dec. 25, 2013 (CN) .......................... 2013 1 0724111

(51) Int. Cl.
*G06Q 20/34* (2012.01)
*G06F 21/12* (2013.01)
(Continued)

(52) U.S. Cl.
CPC ......... *G06Q 20/34* (2013.01); *G06F 17/2705* (2013.01); *G06F 21/12* (2013.01);
(Continued)

(58) Field of Classification Search
CPC .... G06Q 20/34; G06Q 20/40; G06F 17/2705; G06F 21/12; G06F 21/6218; G06F 21/77; H04L 63/06; H04L 63/0807
(Continued)

(56) References Cited

U.S. PATENT DOCUMENTS

2002/0040936 A1\*    4/2002    Wentker ................... G06F 8/60
                                                                235/492
2003/0056028 A1     3/2003    Underwood et al.
(Continued)

*Primary Examiner* — Eleni A Shiferaw
*Assistant Examiner* — Sakinah White Taylor
(74) *Attorney, Agent, or Firm* — Hammer & Associates, P.C.

(57) ABSTRACT

A method for secure execution of an entrusted management command. The method includes: when an entrusted management command is received by a slave security domain, same parses the command, acquires a predetermined byte in the command, a token length, and a token, and transmits to a master security domain; when data is received by the master security domain, same checks a lifecycle status of the master security domain, a lifecycle status and a permission of the slave security domain, verifies the token when all checks are successful, and returns a status code to the slave security domain; and, the slave security domain determines the received status code, and if same is a predetermined status code, then executes an entrusted management operation. The present invention allows for determination of the validity of an entrusted management command, and further allows for prevention of an invalid entrusted management command from being executed, thus ensuring the security of data in a Java card.

18 Claims, 4 Drawing Sheets

(51) Int. Cl.
  *G06F 17/27* (2006.01)
  *G06F 21/62* (2013.01)
  *G06Q 20/40* (2012.01)
  *H04L 29/06* (2006.01)
  *G06F 21/77* (2013.01)

(52) U.S. Cl.
  CPC .......... *G06F 21/6218* (2013.01); *G06F 21/77* (2013.01); *G06Q 20/40* (2013.01); *H04L 63/06* (2013.01); *H04L 63/0807* (2013.01)

(58) Field of Classification Search
  USPC .......................................................... 726/30
  See application file for complete search history.

(56) References Cited

U.S. PATENT DOCUMENTS

| | | | |
|---|---|---|---|
| 2004/0123152 A1* | 6/2004 | Le Saint | G06F 21/52 726/9 |
| 2009/0007156 A1* | 1/2009 | Baek | H04L 12/2803 719/328 |

* cited by examiner

METHOD FOR SECURE EXECUTION OF ENTRUSTED MANAGEMENT COMMAND

FIELD OF THE INVENTION

The present invention relates to a method for safely executing an entrusted management command, in particular in the field of smart card technology.

PRIOR ART

A Java card is a smart card which can run a Java program. There are two classes of visible objects in the Java card, which are a Card Manager and an Applet of Java card. The Card Manager is also called as Card Issuer's Security Domain (ISD) or Main Security Domain, except for ISD, a Java card also has a plurality of Security Domains (SD), and generally, the ISD does not manage all of the applets, especially the applets which are not belong to the card issuer. Thus, there is a mechanism that after being authorized by the ISD, the SD manages the applets by executing an entrusted management command.

In the above mechanism, the entrusted management command is specifically APDU data which includes a token; after it receives an entrusted management command sent from a runtime environment (RE), the SD executes entrusted management operation, determines whether the entrusted management command is legitimate by verifying the token inside the entrusted management command in the process of the entrusted management operation; those skilled in the art find that there exists many potential risks in legitimacy of the entrusted management command because there is no specified method for verifying the token in prior art.

SUMMARY OF THE INVENTION

The object of the invention is to provide a method for safely executing an entrusted management command, which can determine whether the entrusted management command is legitimate, so as to the method can guarantee safety of data in a Java card by avoiding executing an illegal entrusted management command.

Thus, the present invention provides a method for safely executing an entrusted management command, wherein, the method comprises following steps:

Step A, receiving, by a security domain, APDU data sent from a runtime environment, parsing the APDU data in the case that the APDU data is an entrusted management command, locating a token length in the APDU data and obtaining the token length and the token in the APDU data;

Step B, sending, by the security domain, a preset byte, the token length and the token in the APDU data to a card issuer's security domain;

Step C, checking, by the card issuer's security domain, whether a lifecycle status of itself is a card_locked after receiving data sent from the security domain, if yes, executing restore operation, and returning an exception code to the security domain, and executing Step G; otherwise, executing Step D;

Step D, checking, by the card issuer's security domain, whether a lifecycle status of the security domain is SELECTABLE or PERSONALIZED, if yes, executing Step E; otherwise, returning an exception code to the security code, and executing Step G;

Step E, checking, by the card issuer's security domain, whether the security domain has entrusted management access, if yes, executing Step F; otherwise, returning the exception code to the security domain, and executing Step G;

Step F, performing, by the card issuer's security domain, signature calculation on a preset byte in the APDU data according to a preset algorithm, determining whether a result from signature calculation is identical to the token in the APDU data, if yes, returning a preset status code to the security domain, and executing Step G; otherwise, returning the exception code to the security domain, and executing Step G; and Step G, receiving, by the security domain, data returned by the card issuer's security domain, executing entrusted management operation according to the entrusted management command in the case that the data returned by the card issuer's security domain is the preset status code, and being end; otherwise, stopping operation, and returning an error code to the runtime environment, then being end.

Preferably, Step A further includes:

Step A1, receiving, by the security domain, APDU data sent from the runtime environment, subsequently, determining a type of the APDU data, executing Step A2 in the case that the APDU data is a first entrusted management command; executing Step A3 in the case that the APDU data is a second entrusted management command; executing Step A4 in the case that the APDU data is a third entrusted management command; executing Step A5 in the case that the APDU data is a fourth entrusted management command;

Step A2, in accordance with a first preset method, locating a byte for indicating the token length in the APDU data, and obtaining the token length and the token in the APDU data, executing Step A6;

Step A3, in accordance with a second preset method, locating the byte for indicating the token length in the APDU data, and obtaining the token length and the token in the APDU data, executing Step A6;

Step A4, in accordance with a third preset method, locating the byte for indicating the token length in the APDU data, and obtaining the token length and the token in the APDU data, executing Step A6;

Step A5, in accordance with a fourth preset method, locating the byte for indicating the token length in the APDU data, and obtaining the token length and the token in the APDU data, executing Step A6; and Step A6, obtaining the token length and the token in the APDU data.

Preferably, the first entrusted management command is a preload command, locating the byte for indicating the token length in the APDU data in accordance with the first preset method specifically comprising:

Step A2-1, locating a byte for indicating a length of security domain identifier in accordance with a load file identifier length in the APDU data;

Step A2-2, locating a byte for indicating a length of load file data block hash in accordance with the length of security domain identifier length;

Step A2-3, locating a byte for indicating a length of load parameter domain in accordance with the length of load file data block hash; and Step A2-4, locating the byte for indicating the token length in accordance with the length of load parameter domain.

Preferably, when the APDU data is the first entrusted management command, the process of executing entrusted management operation includes: saving the load file identifier in the APDU data, authorizing the security domain access to load applications.

Preferably, the second entrusted management command is an installing command, the process of locating the byte for indicating the token length in the APDU data according to the second preset method including following steps:

Step A3-1, locating a byte for indicating a length of executable module identifier according to a length of executable load file identifier length in the APDU data;

Step A3-2, locating a byte for indicating a length of application identifier according to the length of executable module identifier;

Step A3-3, locating a byte for indicating a length of application access according to the length of application identifier;

Step A3-4, locating a byte for indicating a length of installation parameter domain according to the length of application access; and Step A3-5, locating the byte for indicating the token length according to the length of installed parameter domain.

Preferably, when the APDU data is the second entrusted management command, the process of executing entrusted management operation including: when the third byte of the APDU data is a second preset value, indexing an application according to an application identifier in the APDU data, setting a context of the indexed application, invoking an installed interface of the indexed application to install the indexed application; when the third byte of the APDU data is a third preset value, indexing the application according to the application identifier in the APDU data, setting the context of the indexed application, invoking the installed interface of the indexed application to install the indexed application, and adding access to being selected to the indexed application.

Preferably, when the third entrusted management command is a selecting command, the process of locating the byte for indicating the token length in the APDU data according to the third preset method specifically including following steps:

Step A4-1, locating a byte for indicating the length of application access according to the length of application identifier in the APDU command; and Step A4-2, locating the byte for indicating the token length according to the length of application access.

Preferably, when the APDU data is the third entrusted management command, executing entrusted management operation including: indexing the application according to the application identifier in the APDU data, and adding access to being selected to the indexed application.

Preferably, the fourth entrusted management command is an extradition command, the fourth entrusted management command is specifically is an extradition command.

Preferably, locating the byte for indicating the token length in the APDU data according to the fourth preset method specifically including following steps:

Step A5-1, locating the byte for indicating the length of application identifier according to the length of security domain identifier length in the APDU data; and Step A5-2, locating the byte for indicating the token length according to the length of application identifier.

Preferably, when the APDU data is the fourth entrusted management command, the process of executing entrusted management operation including: indexing the application according to the application identifier in the APDU data, modifying the security domains which relates to the indexed application to the security domains corresponding to the security domain in the APDU data.

The advantage of the method of the present invention is that the legitimate of the entrusted management command can be determined according to the method for executing an entrusted management command, which is provided in the present invention, so as to avoiding to executing an illegal entrusted management command, in this way, security of data in a Java card can be ensured.

BRIEF DESCRIPTION OF THE DRAWINGS

The Embodiments of the present invention or technical solutions in the prior art are further described more clearly and completely with the drawings in the Embodiments of the present invention. Obviously, Embodiments described are just a few of all Embodiments of the present invention, when it comes to technicians in the field, other drawings can be obtained by them without inventive work.

EMBODIMENTS

The technical solution in the Embodiments of the present invention is further described more clearly and completely with the drawings in the Embodiments of the present invention. Apparently, Embodiments described are just a few of all Embodiments of the present invention. On the basis of Embodiments of the invention, all other related Embodiments made by those skilled in the art without inventive work belong to the scope of the invention.

In the present invention, an entrusted management operation includes: preload operation, install operation, selection operation and extradition operation. Correspondingly, the entrusted management command includes: a preload command, an installing command, a selecting command and an extradition command.

Embodiment 1

Figure 1:
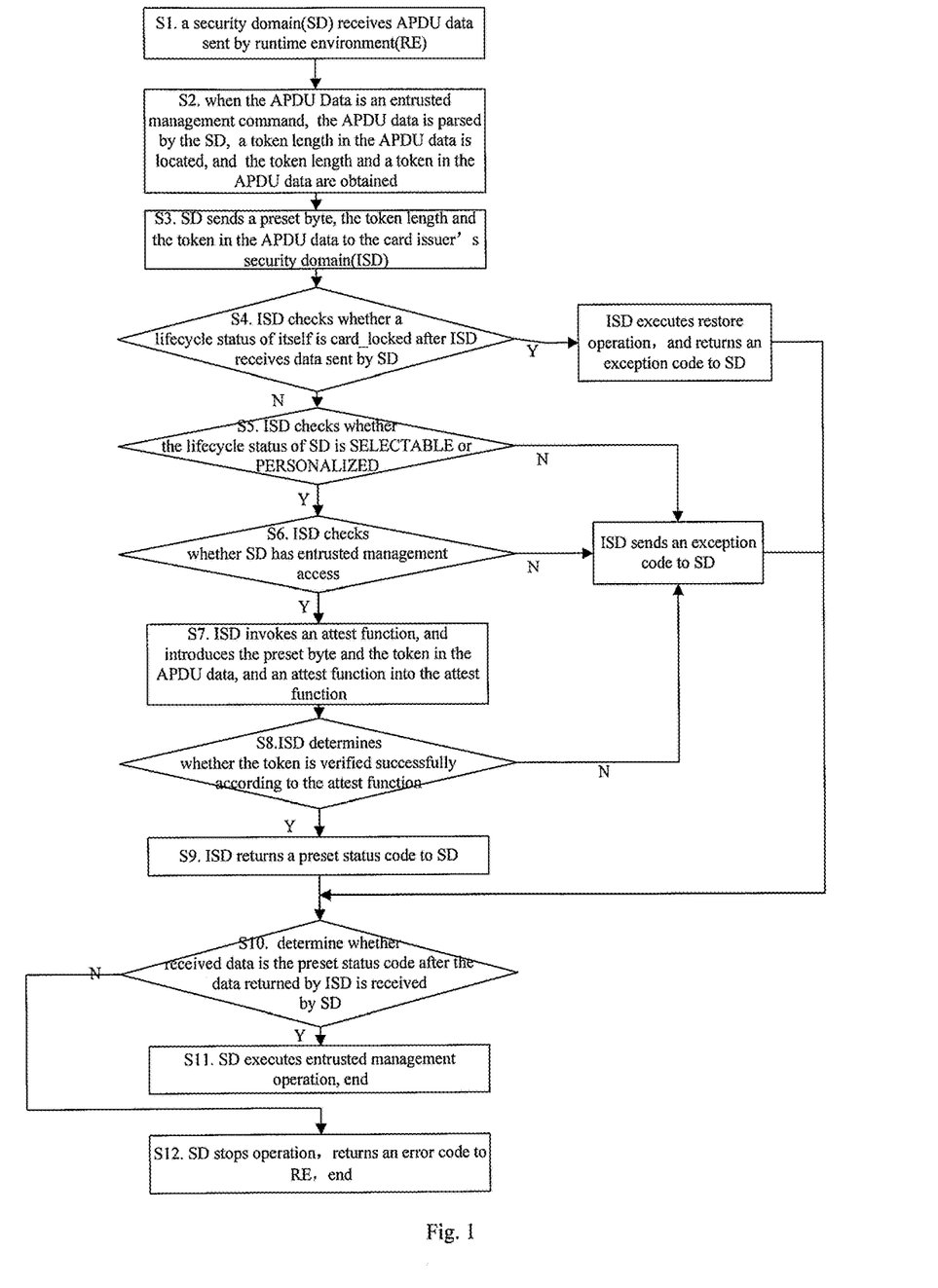
FIG. 1 is a flow diagram illustrating a method for executing an entrusted management command safely, which is provided in Embodiment 1 of the present invention.

Embodiment 1 of the present invention provides a method for executing an entrusted management command safely, as shown in FIG. 1, the method specifically includes:

Step S1, APDU data sent from a runtime environment (RE) is received by a security domain (SD); and Step S2, when the APDU data is an entrusted management command, the APDU data is parsed by the security domain, a token length in the APDU data is located, and the token length and a token in the APDU data is obtained;

Preferably, after Step S2, the method further includes:

Step S2-1, whether the token length in the APDU data is 0x00 is determined by the security domain, if yes, Step S2-2 is executed, otherwise, Step S3 is executed; and Step S2-2, whether the security domain has access to manage a card is determined by itself, if yes, Step S11 is executed; otherwise, an error code is returned to the runtime environment;

In a Java card, each security domain corresponds to a subject in a security domain array, when a security domain is created, an ID number, which is a subscript of security domain array, is allocated and saved for it, according to the ID number, a subject in the security domain array could be indexed, so as to an element of the object could be obtained;

Specifically, that whether the security domain has access to manage a card is determined by itself specifically includes: the ID number of the security domain is obtained by the security domain according to a first preset global variable, the object in the security domain array is indexed according to the obtained ID number, a first preset element of the object is obtained, whether a value of the first preset element is a first preset value is determined, if yes, the security domain has access to manage the card; otherwise, the security domain does not have access to manage the card.

In Embodiment 1, the first preset global variable is a context of the security domain, the first preset element is a privilege element; the first preset value is 0x00;

Specifically, the context of the security domain is a global variable whose length has one byte, four bits in the high order means a channel where the current security domain is, four bits in the low order means the ID number of the current security domain, the ID number of the security domain is obtained according to the four bits in the low order of the context of the security domain.

Step S3, a preset byte, the token length and the token in the APDU data are sent to the card issuer's security card (ISD);

Specifically, in Embodiment 1, the preset byte is from the third byte to a byte before the token length in the APDU data.

Figure 2:
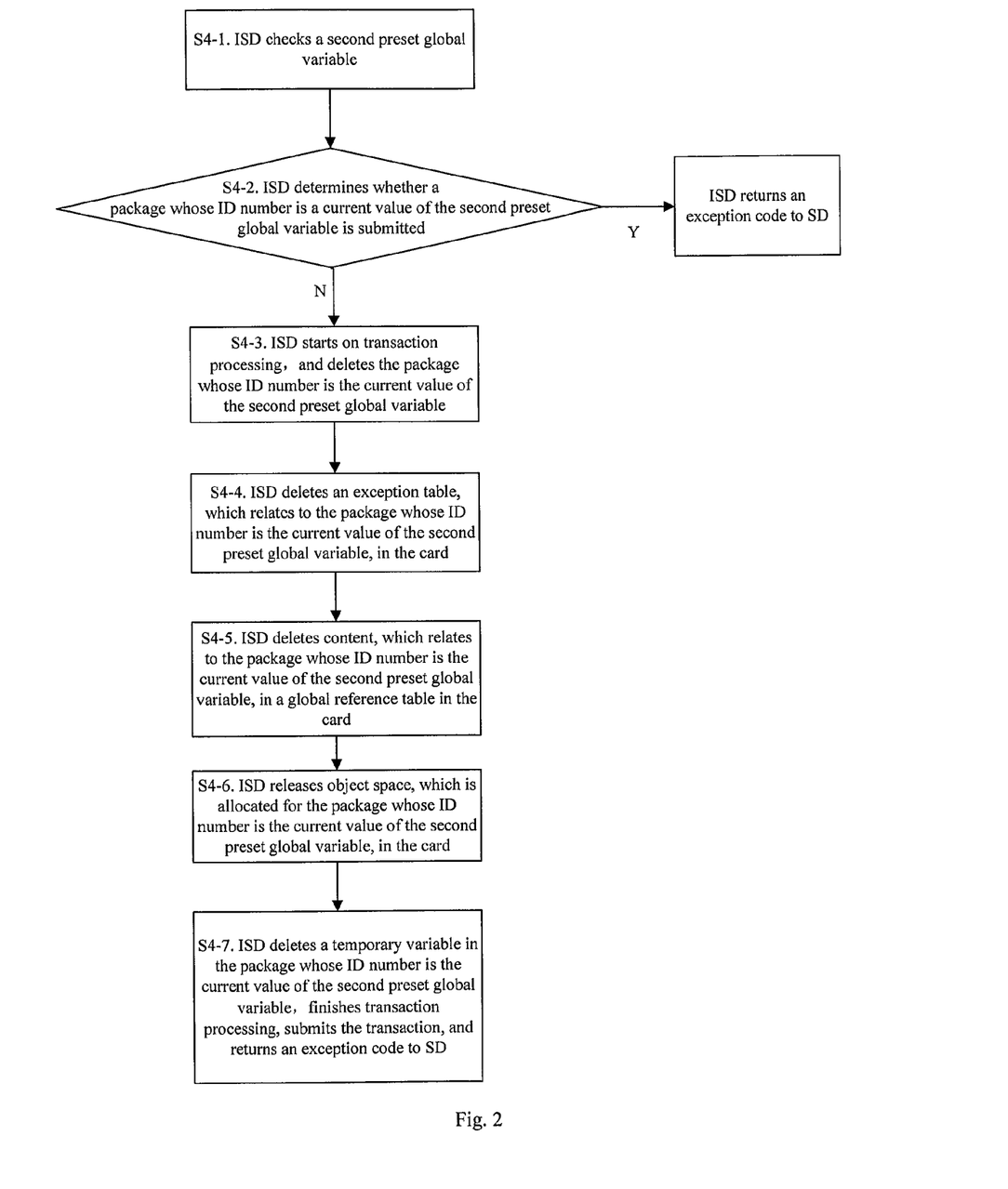
FIG. 2 is a flow diagram illustrating that ISD executes restore operation and return an exception code to SD which is provided in Embodiment 1 of the present invention.

Step S4, after data sent from the security domain is received by the card issuer's security domain, the card issuer's security domain checks whether its lifecycle status is card_locked, if yes, the card issuer's security domain executes restore operation, returns an exception code to the security domain, and Step S10 is executed; otherwise, Step S5 is executed;

Specifically, that the card issuer's security domain checks whether its lifecycle status is card_locked includes: a second preset element of a card issuer's security domain object is obtained by the card issuer's security domain, whether a value of the second preset element is a fourth preset value is checked, if yes, the lifecycle status of the card issuer's security domain is card_locked; otherwise, the lifecycle status of the card issuer's security domain is not card_locked;

In Embodiment 1, the second preset element is a state element; a sixth preset value is 0x7F;

As shown in FIG. 2, that the card issuer's security domain executes restore operation, and returns the exception code to the security domain includes:

Step S4-1, a second preset global variable is checked by the card issuer's security domain;

In Embodiment 1, the second preset global variable is package ID;

Step S4-2, the card issuer's security domain determines whether a package whose ID number is a current value of the second preset global variable is submitted, if yes, an exception code is returned by the card issuer's security domain to the security domain; otherwise, Step S4-3 is executed;

Step S4-3, the card issuer's security domain starts on transaction processing, and deletes the package whose ID number is the current value of the second preset global variable;

Step S4-4, the card issuer's security domain deletes an exception table, which relates to the package whose ID number is a current value of the second preset global variable, in the card;

Step S4-5, the card issuer's security domain deletes content, which relates to the package whose ID number is the current value of the second preset global variable, in a global reference table in the card;

Step S4-6, the card issuer's security domain releases object space, which is allocated for the package whose ID number is the current value of the second preset global variable, in the card;

Step S4-7, the card issuer's security domain deletes a temporary variable in the package whose ID number is the current value of the second preset global variable, the transaction processing is terminated, the transaction is submitted, and an exception code is returned to security domain;

In Embodiment 1, if an exception which appears in the process of transaction processing leads to failure of transaction processing, transaction rollback is executed, and the exception code is returned to the security domain.

Step S5, the card issuer's security domain checks whether the lifecycle status of the security domain is SELECTABLE or PERSONALIZED, if yes, Step S6 is executed; otherwise, the exception code is returned to the security domain by the card issuer's security domain, and Step S10 is executed;

Specifically, that the card issuer's security domain checks whether the lifecycle status of the security domain is SELECTABLE or PERSONALIZED includes: an ID number of the security domain is obtained by the card issuer's security domain according to the first preset global variable, the subject in the security domain array is indexed according to the obtained ID number, a third preset element of the obtained object is obtained, a value of the third preset element is checked, the lifecycle status of the security domain is SELECTABLE in the case that the value of the third preset element is a fifth preset value; the lifecycle status of the security domain is PERSONALIZED in the case that the value of the third preset element is the sixth preset value; and the lifecycle status of the security domain is neither SELECTABLE nor PERSONALIZED in the case that the value of the third preset element is other value;

In Embodiment 1, the first preset global variable is context of the security domain, the third preset element is a state element; a seventh preset value is 0x07; the sixth preset value is 0x0F;

Specifically, the ID number of the security domain is obtained by the card issuer's security domain according to the four bits in low order of the context of the security domain.

Step S6, the card issuer's security domain checks whether the security domain has entrusted management access, if yes, execute Step S7; otherwise, the card issuer's security domain returns the exception code to the security domain, and Step S10 is executed;

Specifically, that the card issuer's security domain checks whether the security domain has entrusted management access includes: the ID number of the security domain is obtained by the card issuer's security domain according to the first preset global variable, the subject in the security domain array is indexed according to the obtained ID number, the first preset element of the subject is obtained, and whether a value of a preset bit of the first preset element is the seventh preset value is determined, if yes, the security domain has the entrusted management access; otherwise, the security domain does not have the entrusted management access;

In Embodiment 1, the first preset global variable is context of the security domain; the first preset element is a privilege element; the preset bit is a sixth bit and a eighth bit from the low order end; the seventh preset value is 1; determining whether the value of the preset bit of the first preset element is the seventh preset value includes: determine whether both the value of the sixth bit and the value of the eighth bit from the low order end are 1;

Specifically, the ID number of the security domain is obtained by the card issuer's security domain according to the four bits in low order of the context;

In Embodiment 1, orders of Step S5 and Step S6 can be exchanged.

Step S7, an attest function is invoked by the card issuer's security domain, the preset byte and the token in the APDU data and an attest key are introduced into the attest function;

Before Step S7, the method further includes: a Key value is obtained by the card issuer's security domain from a memory, RSA public key coefficient and RSA public index are initialized according to the obtained key value, and the RSA public key is initialized as the attest key;

Specifically, a Key table is stored in the memory;

That the Key value is obtained by the card issuer's security domain from the memory specifically includes: a token verification key in the Key table in the memory is checked, a security key array in the token verification key is obtained, RSA Key in the security key array is obtained, the Key value of RSA Key is obtained.

Step S8, the card issuer's security domain determines whether the token is verified successfully according to a returned value of the attest function, if yes, Step S9 is executed; otherwise, an exception code is returned to the security domain by the card issuer's security domain, and Step S10 is executed;

In Embodiment 1, the card issuer's security domain determines whether the returned value of the attest function is a preset value, if yes, the token is verified successfully; otherwise, the token is not verified successfully; specifically, the preset value is 1.

Step S9, a preset status code is returned by the card issuer's security domain to the security domain, and Step S10 is executed;

Specifically, in Embodiment 1, the preset status code is 0x00.

Step S10, after receiving data returned by the card issuer's security domain, the security domain determines whether the received data is the preset status code, if yes, Step S11 is executed; otherwise, Step S12 is executed;

Specifically, in Embodiment 1, the preset status code is 0x00.

Step S11, the security domain executes entrusted management operation, ends;

Step S12, the security domain stops operating, and returns an error code to the runtime environment, then ends.

Embodiment 2

Figure 3:
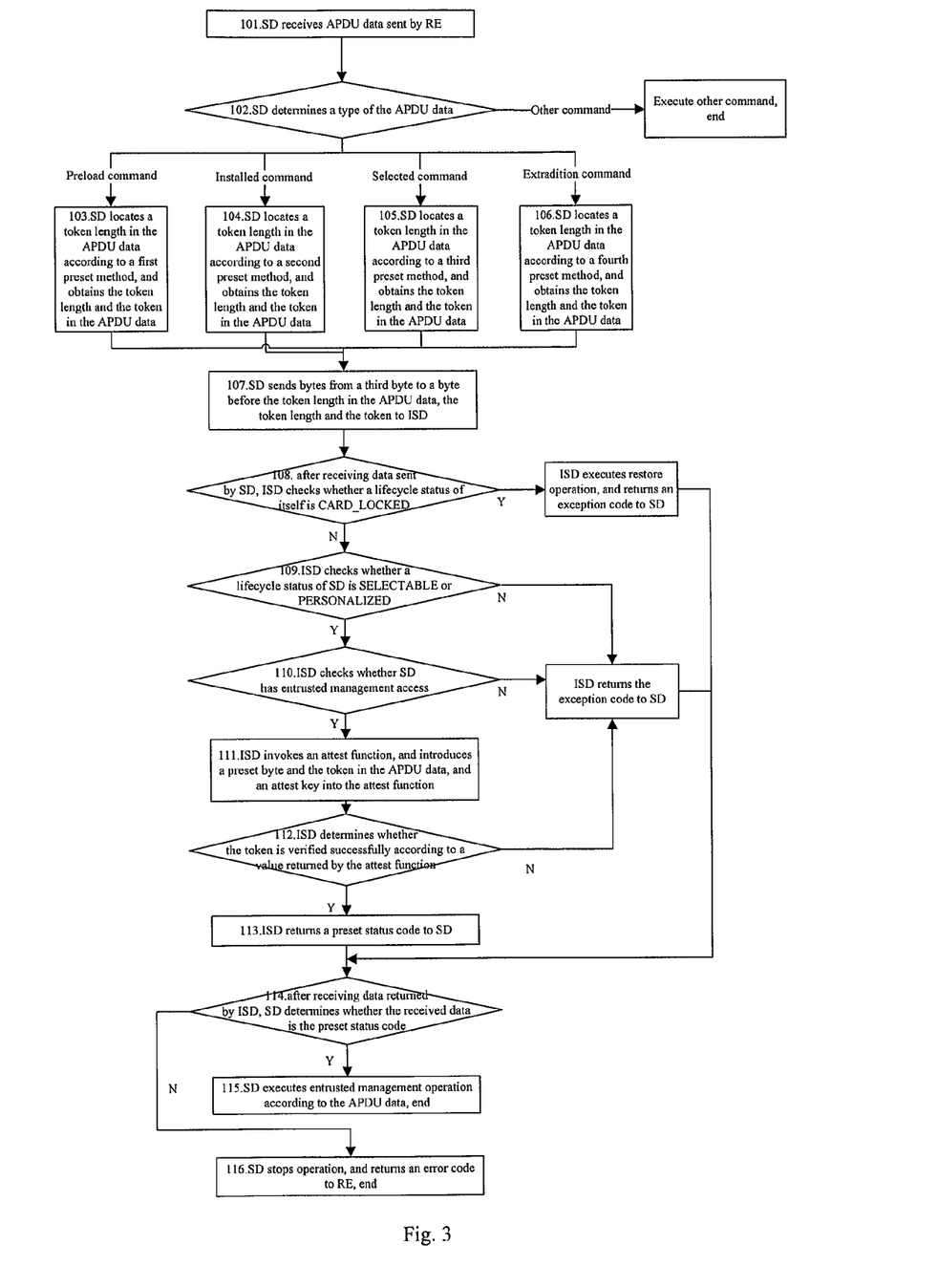
FIG. 3 is a flow diagram illustrating a method for executing an entrusted management command safely, which is provided in Embodiment 2 of the present invention.

Embodiment 2 of the present invention provides a method for executing an entrusted management command safely, as shown in FIG. 3, the method specifically includes:

Step 101, APDU data sent from a runtime environment (RE) is received by a security domain (SD); and Step 102, a type of the APDU data is determined by the security domain, Step 103 is executed in the case that the APDU data is a preload command; Step 104 is executed in the case that the APDU data is an installing command; Step 105 is executed in the case that the APDU data is a selecting command; Step 106 is executed in the case that the APDU data is an extradition command; other command is executed in the case that the APDU data is other command, then being end;

In Embodiment 2, that the type of the APDU data is determined by the security domain specifically includes:

Step 102-1, the first byte of the APDU data is checked by the security domain, Step 102-2 is executed in the case that the first byte is 0x80 or 0x84; otherwise, the APDU data is other command;

Step 102-2, the second byte of the APDU data is checked by the security domain, Step 102-3 is executed in the case that the second byte is 0xE6; otherwise, the APDU data is other command;

Step 102-3, the third byte of the APDU data is checked by the security domain, Step 102-4 is executed in the case that the third byte is 0x02; Step 102-5 is executed in the case that the third byte is 0x04 or 0x0C; Step 102-6 is executed in the case that the third byte is 0x08; Step 102-7 is executed in the case that the third byte is 0x10; otherwise, the APDU data is other command;

Step 102-4, whether the fourth byte of the APDU data is no less than 0x0A is checked by the security domain, if yes, the APDU data is a preload command; otherwise, the APDU data is other command;

Step 102-5, whether the fourth byte of the APDU data is no less than 0x18 is checked by the security domain, if yes, the APDU data is an installing command; otherwise, the APDU data is other command;

Step 102-6, whether the fourth byte of the APDU data is no less than 0x0C is checked by the security domain, if yes, the APDU data is a selecting command; otherwise, the APDU data is other command;

Step 102-7, whether the fourth byte of the APDU data is no less than 0x10 is checked by the security domain, if yes, the APDU data is an extradition command; otherwise, the APDU data is other command.

Figures 4, 5:
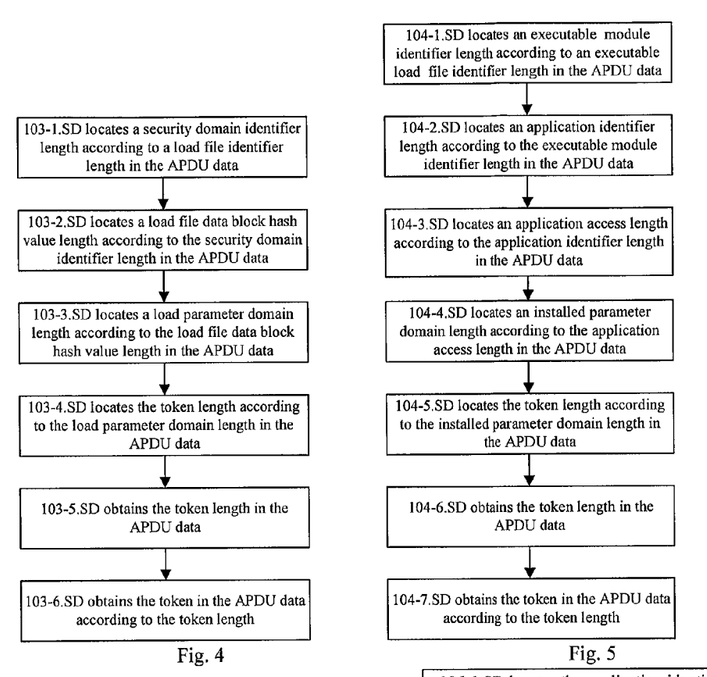
FIG. 4 is a specific flow diagram of Step 103 in FIG. 3.
FIG. 5 is a specific flow diagram of Step 104 in FIG. 3.

Step 103, a token length in the APDU data is located by the security domain according to a first preset method, and the token length and a token are obtained, Step 107 is executed;

As shown in FIG. 4, in Embodiment 2, Step 103 specifically includes:

Step 103-1, a security domain identifier length is located by the security domain according to a load file identifier length in the APDU data;

Specifically, when the APDU data is a preload command, the first byte of a data field of the APDU data is the load file identifier length; Step 103-1 includes that: a load file identifier in the APDU data is determined by the security domain according to the first byte of the data field of the APDU data, a byte after the load file identifier is located, which is the security domain identifier length;

For instance, the load file identifier length has five bytes in the case that the first byte of the data field of the APDU data is 0x05, it is determined that from the second byte to the sixth byte of the data field of the APDU data is the load file identifier, the byte after the load file identifier, which is the seventh byte of the data field of the APDU data, is located as the security domain identifier length;

Step 103-2, a length of load file data block hash is located by the security domain according to the security domain identifier length in the APDU data;

Specifically, Step 103-2 includes that: the security domain identifier in the APDU data is determined by the security domain according to the security domain identifier length in the APDU data, a byte after the security domain identifier is located as the length of the load file hash value;

For instance, the security field identifier length has 0 byte in the case that the seventh byte of the data field of the APDU data, which is 0x00, is the security field identifier length, it is determined that the security domain identifier is not included in the data field of the APDU data, a byte after the security domain identifier length, which is the eighth byte of the data field of the APDU data, is located as the length of the load file hash value;

Step 103-3, a load parameter domain length is located by the security domain according to the length of the load file data block hash in the APDU data;

Specifically, Step 103-3 includes that: a load file hash value in the APDU data is determined by the security domain according to the load file hash value length in the APDU data, a byte after the load file hash value is located as the load parameter domain length;

For instance, the load file hash value length has two bytes in the case that the eighth byte of the data field of the APDU data, which is 0x02, is the load file hash value length, it is determined that from the ninth byte to the tenth byte of the data field of the APDU data is the load file hash value, a byte after the load file hash value, which is the eleventh byte of the data field of the APDU data, is located as the load parameter domain length;

Step 103-4, the token length is located by the security domain according to the load parameter domain length in the APDU data;

Specifically, Step 103-4 includes that: a load parameter domain in the APDU data is determined by the security domain according to the load parameter domain length in the APDU data, a byte after the load parameter domain is located as the token length;

For instance, if the eleventh byte of the data field of the APDU data, which is 0x00, is the load parameter domain length, the load parameter domain length has 0 byte, it is determined that the load parameter domain is not included in the APDU data, a byte after the load parameter domain length, which is the twelfth byte of the data field of the APDU data, is located as the token length;

Step 103-5, the token length in the APDU data is obtained by the security domain;

Step 103-6, the token in the APDU data is obtained by the security domain according to the token length.

For instance, the token length has five bytes in the case that the twelfth byte of the data field of the APDU data, which is 0x05, is the token length, from the thirteenth byte to the seventh byte of the data field of the APDU data is obtained, so as to the token is obtained.

Step 104, the token length in the APDU data is located by the security domain according to a second preset method, and the token length and the token in the APDU data are obtained, Step 107 is executed;

As shown in FIG. 5, in Embodiment 2, Step 104 specifically includes: Step 104-1, an executable module identifier length is located by the security domain according to an executable load file identifier length in the APDU data;

Specifically, when the APDU data is an installing command, the first byte of the data field of the APDU data is the executable load file identifier length; Step 104-1 includes that: an executable load file identifier in the APDU data is determined by the security domain according to the first byte of the data field of the APDU data, a byte after the executable load file identifier is located as the executable module identifier length;

For instance, if the first byte of the data field of the APDU data is 0x05, the executable load file identifier length has five bytes, it is determined that from the second byte to the sixth byte of the data field of the APDU data is the executable load file identifier, a byte after the executable load file identifier, which is the seventh byte of the data field of the APDU data, is located as the executable module identifier length;

Step 104-2, an application identifier length is located by the security domain according to the executable module identifier length in the APDU data;

Specifically, Step 104-2 includes that: an executable module identifier in the APDU data is determined by the security domain according to the executable module identifier length in the APDU data, a byte after the executable module identifier is located as the application identifier length;

For instance, the executable module identifier length has 0 byte in the case that the seventh byte of the data field of the APDU data, which is 0x00, is the executable module identifier length, it is determined that the executable module identifier is not included in the data field of the APDU data, a byte after the executable module identifier length, which is the eighth byte of the data field of the APDU data, is located as the application identifier length;

Step 104-3, an application access length is located by the security domain according to the application identifier length in the APDU data;

Specifically, Step 104-3 includes that: an application identifier in the APDU data is determined by the security domain according to the application identifier length in the APDU data, a byte after the application identifier is located as the application access length;

For instance, the application identifier length has two bytes in the case that the eighth byte of the data field of the APDU data, which is 0x02, is the application identifier length, it is determined that from the ninth byte to the tenth byte of the data field of the APDU data is the application identifier, a byte after the application identifier, which is the eleventh byte of the data field of the APDU data, is the application access length;

Step 104-4, an installation parameter domain length is located by the security domain according to the application access length in the APDU data;

Specifically, Step 104-4 includes that: an application access in the APDU data is determined by the security domain according to the application access length in the APDU data, a byte after the application access is located as the installation parameter domain length;

For instance, the application access length has two bytes in the case that the eleventh byte of the data field of the APDU data, which is 0x02, is the application access length, it is determined that from the twelfth byte to the thirteenth byte of the data field of the APDU data is the application access, a byte after the application access, which is the fourteenth byte of the data field of the APDU data, is the installed parameter domain length;

Step 104-5, the token length is located by the security domain according to the installation parameter domain length in the APDU data;

Specifically, Step 104-5 includes that: an installed parameter domain in the APDU data is determined by the security domain according to the installed parameter domain length in the APDU data, a byte after the installed parameter domain is located as the token length;

For instance, the installation parameter domain length has 0 byte in the case that the fourteenth byte of the data field of the APDU data, which is 0x00, is the install parameter domain length, it is determined that the installed parameter domain is not included in the APDU data, a byte after the installed parameter domain length, which is the fifteenth byte of the data field of the APDU data, is located as the token length;

Step 104-6, the token length in the APDU data is obtained by the security domain;

Step 104-7, the token in the APDU data is obtained by the security domain according to the token length.

For instance, the token length has five bytes in the case that the fifteenth byte of the data field of the APDU data, which is 0x05, is the token length, bytes from the fifteenth byte to the nineteenth byte of the data field of the APDU data are obtained, so as to the token is obtained.

Figure 6:
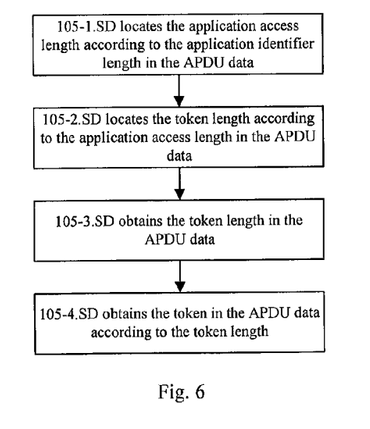
FIG. 6 is a specific flow diagram of Step 105 in FIG. 3.

Step 105, the token length in the APDU data is located by the security domain according to a third preset method, and the token length and the token in the APDU data are obtained, Step 107 is executed;

As shown in FIG. 6, in Embodiment 2, Step 105 specifically includes:

Step 105-1, the application access length is located by the security domain according to the application identifier length in the APDU data;

Specifically, when the APDU data is a selecting command, both of the first byte and the second byte of the data field of the APDU data are 0x00, the third byte is the application identifier length; Step 105-1 includes that: the application identifier in the APDU data is determined by the security domain according to the third byte of the data field of the APDU data, a byte after the application identifier is located as the application access length;

For instance, if the third byte of the data field of the APDU data is 0x05, the application identifier length has five bytes, it is determined that from the fourth byte to the eighth byte of the data field of the APDU data is the executable load file identifier, a byte after the executable load file identifier, which is the ninth byte of the data field of the APDU data, is located as the application access length;

Step 105-2, the token length is located by the security domain(SD) according to the application access length in the APDU data;

Specifically, when the APDU data is a selecting command, the application access length is 0x01, a byte after the application access is 0x00, and Step 105-2 includes: the application access in the APDU data is determined by the security domain according to the application access length in the APDU data, the second byte after the application access is located as the token length;

For instance, if the ninth byte of the data field of the APDU data, which is 0x01, is the application access length, the application access length has one byte, it is determined that the tenth byte of the data field of the APDU data is the application identifier, the second byte after the application identifier, which is the twelfth byte of the data field of the APDU data, is located as the token length;

Step 105-3, the token length in the APDU data is obtained by the security domain;

Step 105-4, the token in the APDU data is obtained by the security domain according to the token length.

For instance, if the twelfth byte of the data field of the APDU data, which is 0x04, is the token length, the token length has four bytes, bytes from the thirteenth byte to the sixteenth byte of the data field of the APDU data are obtained, so as to the token is obtained.

Figure 7:
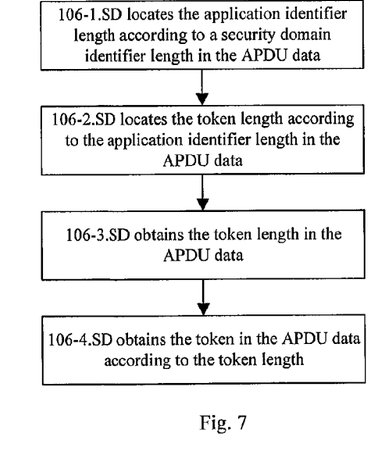
FIG. 7 is a specific flow diagram of Step 106 in FIG. 3.

Step 106, the token length in the APDU data is located by the security domain according to a fourth preset method, and the token length and the token are obtained from the APDU data, Step 107 is executed;

As shown in FIG. 7, in Embodiment 2, Step 106 specifically includes:

Step 106-1, the application identifier length is located by the security domain according to a security domain identifier length in the APDU data;

Specifically, when the APDU data is an extraction command, the first byte of the data field of the APDU data is the security domain identifier length, the first byte after the security domain identifier is 0x00; Step 106-1 includes that: a security domain identifier in the APDU data is determined by the security domain according to the first byte of the data field of the APDU data, the second byte after the security domain identifier is located as the application identifier length;

For instance, if the first byte of the data field of the APDU data is 0x05, the security domain identifier length has five bytes, it is determined that from the second byte to the sixth byte of the data of the APDU data is the security domain identifier, the second byte after the security domain identifier, which is the eighth byte of the data field of the APDU data, is the application identifier length;

Step 106-2, the token length is located by the security domain according to the application identifier length in the APDU data;

Specifically, when the APDU data is a selecting command, both of the first byte and the second byte after the application identifier are 0x00, and Step 106-2 includes that: the application identifier in the APDU data is determined by the security domain according to the application identifier length in the APDU data, the third byte after the application identifier is located as the token length;

For instance, if the eighth byte of the data field of the APDU data, which is 0x06, is the application identifier length, the application identifier length has six bytes, it is determined that from the ninth byte to the fourteenth byte of the data field of the APDU data is the application identifier, and the third byte after the application identifier, which is the seventeenth byte of the data field of the APDU data, is located as the token length;

Step 106-3, the token length in the APDU data is obtained by the security domain;

Step 106-4, the token in the APDU data is obtained by the security domain according to the token length.

For instance, if the seventeenth byte of the data field of the APDU data, which is 0x03, is the token length, the token length has three bytes, bytes from the eighteenth byte to the twentieth byte of the data field of the APDU data are obtained, so as to the token is obtained.

Step 107, bytes, from the third byte to the byte before the token, of the APDU data, the token length and the token are sent to the card issuer's security domain by the security domain;

Step 108, after receiving the data sent from the security domain, the card issuer's security domain checks whether its lifecycle status is card_locked, if yes, the card issuer's security domain executes restore operation, and returns an exception code to the security domain, and Step 114 is executed; otherwise, Step 109 is executed;

In Embodiment 2, the card issuer's security domain checking whether its lifecycle is card_locked specifically includes that: a state element of a card issuer's security domain subject is obtained by the card issuer's security domain, whether a value of the state element is 0x7F is checked, if yes, the lifecycle status of the card issuer's security domain is card_locked; otherwise, the lifecycle status of the card issuer's security domain is not card_locked;

Executing restore operation, and returning an exception code to the security domain specifically includes:

Step 108-1, a second preset global variable is checked;

In Embodiment 2, the second preset global variable is package ID;

Step 108-2, whether a package whose ID number is a current value of the second preset global variable is submitted is determined, if yes, an exception code is returned to the security domain by the card issuer's security domain; otherwise, Step 108-3 is executed;

Step 108-3, transaction processing is started on, the package whose ID is the current value of the second preset global variable is deleted;

Step 108-4, an exception table, which relates to the package whose ID is the current value of the second preset global variable, in the card is deleted;

Step 108-5, content, which relates to the package whose ID is the current value of the second preset global variable, in a global reference table in the card is deleted;

Step 108-6, subject space, which is allocated for the package whose ID is the current value of the second preset global variable, in the card is released;

Step 108-7, a temporary variable in the package whose ID is the current value of the second preset global variable is deleted, transaction processing is terminated, the transaction is submitted, Step 108-8 is executed;

In Embodiment 2, if an exception which leads to failure of transaction processing appears in transaction processing, transaction rollback is executed, subsequently, Step 108-8 is executed;

Step 108-8, an exception code is returned to the security domain.

Step 109, whether the lifecycle status of the security domain is SELECTABLE or PERSONALIZED is checked by the card issuer's security domain, if yes, Step 110 is executed; otherwise, an exception code is returned to the security domain by the card issuer's security domain, Step 114 is executed;

Specifically, in a Java card, each security domain corresponds to a subject in a security domain array, when a security domain is created, an ID number, which is a subscript of the security domain array, is allocated and saved for the security domain; a subject in the security domain array can be indexed according to the ID number, so as to an element of the subject could be obtained;

In Embodiment 2, the card issuer's security domain checking whether the lifecycle status of the security domain is SELECTABLE or PERSONALIZED specifically includes: the ID number of the security domain is obtained by the card issuer's security domain according to four bits in low order of a context of the security domain, the subject in the security domain array is indexed according to the obtained ID number, a state element of the subject is obtained, a value of the state element is checked, the lifecycle status of the security domain is SELECTABLE in the case that the value is 0x07; the lifecycle status of the security domain is PERSONALIZED in the case that the value is 0x0F; and the lifecycle status of the security domain is neither SELECTABLE nor PERSONALIZED in the case that the value is other value.

Step 110, whether the security domain has entrusted management access is checked by the card issuer's security domain, if yes, Step 111 is executed; otherwise, an exception code is returned to the security domain by the card issuer's security domain, and Step 114 is executed;

In Embodiment 2, the card issuer's security domain checking whether the security domain has the entrusted management access specifically includes: the ID number of the security domain is obtained by the card issuer's security domain according to four bits in low order of the context of the security domain, the subject in the security domain array is indexed according to the obtained ID number, a privilege element of the subject is obtained, the privilege element is checked, the security domain has the entrusted management access in the case that a value of the sixth bit and the eighth bit from the low order end of the privilege element is 1; otherwise, the security domain does not have entrusted management access;

In Embodiment 2, Step 109 and Step 110 can be exchanged.

Step 111, an attest function is invoked by the card issuer's security domain, a preset byte and the token in the APDU data, and an attest key are introduced into the attest function;

Before Step 111, the method further includes: a key value is obtained by the card issuer's security domain from a memory, RSA public key coefficient and RSA public key index are initialized according to the obtained key value, and RSA key is initialized as the attest key;

Specifically, a Key table, which includes a token verification key, a receipt key and a data authentication pattern key, etc, is stored in the memory; the token verification key includes: a security key array, a largest key number, a security key number, a first key handle, a current key handle, an original key handle, a sequence container and a key version, etc; the security key array includes RSA Key and DES Key, etc;

The card issuer's security domain obtaining a key value from the memory specifically includes: a token verification key in the Key table in the memory is checked, a security key array in the token verification key is obtained, RSA Key in the security key array is obtained, and a Key value of the RSA Key is obtained.

Step 112, the card issuer's security domain determines whether the token is verified successfully according to the attest function, if yes, Step 113 is executed; otherwise, an exception code is returned to the security domain by the card issuer's security domain, and Step 114 is executed;

In Embodiment 2, whether a returned value of the attest function is a preset value is determined by the card issuer's security domain, if yes, the token is verified successfully; otherwise, the token is not verified successfully; specifically, the preset value is 1.

Step 113, a preset status code is returned to the security domain by the card issuer's security domain, Step 114 is executed;

In Embodiment 2, the preset status code is 0x00.

Step 114, after data returned by the card issuer's security domain is received by the security domain, whether received data is the preset status code is determined, if yes, Step 115 is executed; otherwise, Step 116 is executed;

In Embodiment 2, the preset status code is 0x00.

Step 115, the security domain executes entrusted management operation according to the APDU data, then being end;

Specifically, when the APDU command is a preload command, Step 115 specifically includes: a load file identifier in the APDU data is saved; the security domain has access to load an application;

When the APDU data is an installing command, Step 115 specifically includes: when the third byte of the APDU data is a second preset value, an application is indexed according to the application identifier in the APDU data, a context of the application is set, and an installed interface of the application is invoked to install the application; when the third byte of the APDU data is a third preset value, an application is indexed according to the application identifier in the APDU data, a context of the application is set, an installed interface is invoked to install the application, and the application is added with access to be selected;

In Embodiment 2, the second preset value is 0x04, the third preset value is 0x0C;

When the APDU data is a selecting command, Step 115 specifically includes that: an application is indexed according to the application identifier in the APDU data, and the application is added with access to be selected;

When the APDU data is an extradition command, Step 115 specifically includes that: an application is indexed according to the application identifier in the APDU data, a security domain which relates to the application is modified as the security domain which corresponds to the security domain identifier in the APDU data.

Step 116, the security domain stops operation, and returns an error code to the runtime environment, then being end.

While the preferred Embodiments of the present invention have been shown and described herein, it will be obvious for those skilled in the art that such Embodiments are provided by way of examples only. Any changes and substitutions will be covered by the scope of protection of the present invention. It is intended that the appended claims define the scope of protection of the present invention.

The invention claimed is:

1. A method for safely executing an entrusted management command, wherein, the method comprises the steps of:

Step A, receiving, by a security domain, application protocol data unit (APDU) data sent from a runtime environment; and in the case that the APDU data is the entrusted management command, parsing the APDU data, locating a byte for indicating a token length in the APDU data, and obtaining the token length and the token in the APDU data;

Step B, sending, from the security domain, a preset byte, the token length and the token in the APDU data to a card issuer's security domain;

Step C, checking, by the card issuer's security domain, whether a lifecycle status of itself is a card_locked after the card issuer's security domain receiving data sent from the security domain, if yes, executing restore operation, and returning an exception code to the security domain, and executing Step F; otherwise, executing Step D;

Step D, checking, by the card issuer's security domain, whether the security domain meets a condition of executing the entrusted management operation, if yes, executing Step E; otherwise, returning an exception code to the security domain, and executing Step F; in which, when a lifecycle status of the security domain is SELECTABLE or PERSONALIZED, and the security domain has entrusted management access, the security domain meets the condition of executing the entrusted management operation;

Step E, invoking, by the card issuer's security domain, an attest function, introducing the preset byte and the token in the APDU data, and an attest key into the attest function, and then determining whether the token is verified successfully according to a returned value of the attest function, if yes, returning a preset status code to the security domain, and executing Step F; otherwise, returning an exception code to the security domain, and executing Step F; and Step F, receiving, by the security domain, data returned from the card issuer's security domain, executing the entrusted management operation according to the APDU data in the case that the data returned from the card issuer's security domain is the preset status code, then being end, and wherein the executing entrusted management operation comprises indexing the application according to the application identifier in the APDU data, and adding access to being selected to the indexed application; otherwise, stopping operation, and returning an error code to the runtime environment, then being end.

2. The method as claimed in claim 1, wherein, after Step A, the method further comprises:

determining, by the security domain, whether the token length in the APDU data is 0x00, checking whether the security domain itself has access to manage the card in the case that the token length in the APDU data is 0x00, if yes, executing the entrusted management operation, then being end; otherwise, returning an error code to the runtime environment; executing Step B in the case that the token length in the APDU data is not 0x00.

3. The method as claimed in claim 2, wherein, the security domain itself checking whether it has access to manage the card specifically comprises:

obtaining, by the security domain, an ID number of itself according to a first preset global variable, indexing an object in a security domain array according to the obtained ID number, obtaining a first preset element of the object, determining whether a value of the first preset element is a first preset value, if yes, the security domain has access to manage the card; otherwise, the security domain does not have access to manage the card.

4. The method as claimed in claim 1, wherein, executing, by the card issuer's security domain, restore operation and returning the exception code to the security domain specifically comprises:

checking, by the card issuer's security domain, a second preset global variable, determining whether a package whose ID number equals a current value of the second preset global variable is submitted, if yes, returning the exception code to the security domain; otherwise, starting on transaction processing, which includes deleting the package, an exception table which relates to the package, a content, which relates to the package, in a global reference table and a temporary variable in the package, releasing an object space which is allocated for the package, and then finishing transaction processing; subsequently, submitting the transaction, and returning the exception code to the security domain.

5. The method as claimed in claim 1, wherein, Step A specifically comprises:

Step A1, receiving, by the security domain, APDU data sent from the runtime environment, subsequently, determining a type of the APDU data, executing Step A2 in the case that the APDU data is a first entrusted management command; executing Step A3 in the case that the APDU data is a second entrusted management command; executing Step A4 in the case that the APDU data is a third entrusted management command; and executing Step A5 in the case that the APDU data is a fourth entrusted management command;

Step A2, in accordance with a first preset method, locating the byte for indicating the token length in the APDU data, and obtaining the token length and the token in the APDU data, executing Step A6;

Step A3, in accordance with a second preset method, locating the byte for indicating the token length in the APDU data, and obtaining the token length and the token in the APDU data, executing Step A6;

Step A4, in accordance with a third preset method, locating the byte for indicating the token length in the APDU data, and obtaining the token length in the APDU data and the token, executing Step A6;

Step A5, in accordance with a fourth preset method, locating the byte for indicating the token length in the APDU data, and obtaining the token length in the APDU data and the token, executing Step A6; and Step A6, obtaining the token length and the token in the APDU data.

6. The method as claimed in claim 5, wherein, the first entrusted management command is a preload command specifically;

locating the byte for indicating the token length in the APDU data in accordance with the first preset method specifically comprises:

Step A2-1, locating a byte for indicating a length of security domains identifier in accordance with a length of load file identifier in the APDU data;

Step A2-2, locating a byte for indicating a length of load file data block hash in accordance with the length of security domain identifier;

Step A2-3, locating a byte for indicating a length of load parameter domain in accordance with the length of load file data block hash; and Step A2-4, locating a byte for indicating the token length in accordance with the length of load parameter domain.

7. The method as claimed in claim 6, wherein, the executing entrusted management operation comprises: saving the load file identifier in the APDU data, and authorizing the security domain access to load applications.

8. The method as claimed in claim 5, wherein, the second entrusted management command is specifically an installing command;

locating the byte for indicating the token length in the APDU data according to the second preset method specifically comprises:

Step A3-1, locating a byte for indicating a length of executable module identifier according to a length of executable load file identifier in the APDU data;

Step A3-2, locating a byte for indicating a length of application identifier according to the length of executable module identifier;

Step A3-3, locating a byte for indicating a length of application access length according to the length of application identifier;

Step A3-4, locating a byte for indicating a length of installation parameter domain length according to the length of application access; and Step A3-5, locating the byte for indicating the token length according to the length of installation parameter domain.

9. The method as claimed in claim 8, wherein, the executing entrusted management operation specially comprises: when the third byte of the APDU data is a second preset value, indexing an application according to an application identifier in the APDU data, setting a context of the indexed application, invoking an installed interface of the indexed application to install the indexed application; while when the third byte of the APDU data is a third preset value, indexing the application according to the application identifier in the APDU data, setting the context of the indexed application, invoking the installed interface of the indexed application to install the indexed application, and adding access to being selected to the indexed application.

10. The method as claimed in claim 5, wherein, the third entrusted management command is specifically a selecting command;

locating the byte for indicating the token length in the APDU data according to the third preset method specifically comprises:

Step A4-1, locating a byte for indicating the length of application access according to the length of application identifier in the APDU command; and Step A4-2, locating the byte for indicating the token length according to the length of application access.

11. The method as claimed in claim 5, wherein, the fourth entrusted management command is specifically an extradition command;

locating the byte for indicating the token length in the APDU data according to the fourth preset method specifically comprises:

Step A5-1, locating a byte for indicating the length of application identifier according to the length of security domain identifier in the APDU data; and Step A5-2, locating the byte for indicating the token length according to the length of application identifier length.

12. The method as claimed in claim 11, wherein, the executing entrusted management operation comprises:

indexing an application according to the application identifier in the APDU data, modifying the security domains which relates to the indexed application as the security domains which corresponds to the security domain identifier in the APDU data.

13. The method as claimed in claim 1, wherein, the card issuer's security domain checking whether a lifecycle status of itself is card_locked specifically comprises:

obtaining, by the card issuer's security domain, a second preset element of a card issuer's security domain object, checking whether a value of the second preset element is the fourth preset value, if yes, the lifecycle status of the card issuer's security domain is card_locked; otherwise, the lifecycle status of the card issuer's security domain is not card_locked.

14. The method as claimed in claim 1, wherein,

Step D specifically comprises: checking, by the card issuer's security domain, whether the lifecycle status of the security domain is SELECTABLE or PERSONALIZED, if yes, the card issuer's security domain checking whether the security domain has entrusted management access, the security domain meets the condition of executing the entrusted management operation, and execute Step E in the case that the security domain has entrusted management access; the security domain does not meet the condition of executing the entrusted management operation, the card issuer's security domain returns the exception code to the security domain, and execute Step F in the case that the security domain does not has entrusted management access; if no, the security domain could not meet the condition of executing the entrusted management operation, the card issuer's security domain returns the exception code to the security domain, and executing Step F; or Step D specifically comprises: checking, by the card issuer's security domain, whether the security domain has entrusted management access, the card issuer's security domain checking whether the lifecycle status of the security domain is SELECTABLE or PERSONALIZED in the case that the security domain has entrusted management access, if yes, the security domain meets the condition of executing the entrusted management operation, execute Step E; if no, the security domain does not meet the condition of executing the entrusted management operation, the card issuer's security domain returns the exception code to the security domain, execute Step F; the security domain does not meet the condition of executing the entrusted management operation, the card issuer's security domain returns the exception code to the security domain, and execute Step F in the case that the security domain does not have entrusted management access.

15. The method as claimed in claim 14, wherein, the card issuer's security domain checking whether the lifecycle status of the security domain is SELECTABLE or PERSONALIZED specifically comprises:

obtaining, by the card issuer's security domain, an ID number of the security domain according to the first preset global variable, indexing an object in the security domain array according to the ID number, obtaining a third preset element of the object, checking a value of the third preset element, in which the lifecycle status of the security domain is SELECTABLE in the case that the value of the third preset element is a fifth preset value; the lifecycle status of the security domain is PERSONALIZED in the case that the value of the third preset element is a sixth preset value; and the lifecycle status is neither SELECTABLE nor PERSONALIZED in the case that the value of the third preset element is other value.

16. The method as claimed in claim 14, wherein, the card issuer's security domain checking whether the security domain has the entrusted management access specifically comprises:

obtaining, by the card issuer's security domain, the ID number of the security domain according to the first preset global variable, indexing the object in the security domain array according to the ID number, obtaining a first preset element of the indexed object, determining whether a value of a preset bit of the first preset element is a seventh preset value, if yes, the security domain has the entrusted management access; otherwise, the security domain does not have the entrusted management access.

17. The method as claimed as claim 1, wherein, before Step E, the method further comprises:

obtaining, by the card issuer's security domain, a key value from a memory, initializing a RSA public key coefficient and a RSA public key index according to the key value, and initializing a RSA public key as the attest key.

18. The method as claimed in claim 17, wherein, the card issuer's security domain obtaining the key value from the memory specifically comprises:

obtaining, by the card issuer's security domain, a security key array of a token verify key in a key table from the memory, obtaining a RSA key in the security key array, and obtaining a key value of the RSA key.

* * * * *